United States Patent
Ohno

Patent Number: 6,045,042
Date of Patent: *Apr. 4, 2000

[54] NON-CONTACT IC CARD HAVING MULTIPLE RECEIVERS WITH DIFFERENT SIGNAL DETECTION THRESHHOLDS FOR MINIMIZING CURRENT CONSUMPTION

[75] Inventor: Hisashi Ohno, Itami, Japan

[73] Assignee: Mitsubishi Denki Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 07/987,552

[22] Filed: Dec. 8, 1992

Related U.S. Application Data

[63] Continuation-in-part of application No. 07/463,310, Jan. 10, 1990, abandoned.

[30] Foreign Application Priority Data

Oct. 24, 1989 [JP] Japan .................................. 1-247901

[51] Int. Cl.⁷ ...................................................... G06K 7/00
[52] U.S. Cl. .......................... 235/440; 235/380; 235/450; 455/134
[58] Field of Search ............................. 395/800; 235/380, 235/439, 440, 450; 340/825.54, 825.34; 455/134; 712/38

[56] References Cited

U.S. PATENT DOCUMENTS

| | | | |
|---|---|---|---|
| 3,742,438 | 6/1973 | Brede | 367/98 |
| 4,766,295 | 8/1988 | Davis et al. | 235/383 |

FOREIGN PATENT DOCUMENTS

| | | |
|---|---|---|
| 0311312 | 4/1989 | European Pat. Off. . |
| 60-93976 | 5/1985 | Japan . |

OTHER PUBLICATIONS

McDonald et al., "The IC Card The Smart Card That Will Lead Us Into The Future", pp. 152–159 Date Unknown.

F.J. Affinito, "Automatic Feed Forward Gain Ranging Circuit", 1972, pp. 721–722.

*Primary Examiner*—Richard L. Ellis
*Attorney, Agent, or Firm*—Leydig, Voit & Mayer, Ltd.

[57] ABSTRACT

A non-contact IC card includes a CPU for processing data, a memory for storing a program for controlling the CPU, an antenna for transmitting data and receiving data manner, a plurality of receivers each having a different signal detection level for detecting a signal received by the antenna, a selector for selecting one of the plurality of receivers and connecting it to the CPU, and a transmitter for transmitting a signal from the CPU through the antenna.

2 Claims, 4 Drawing Sheets

NON-CONTACT IC CARD HAVING MULTIPLE RECEIVERS WITH DIFFERENT SIGNAL DETECTION THRESHHOLDS FOR MINIMIZING CURRENT CONSUMPTION

This application is a continuation-in-part of application Ser. No. 07/463,310, filed Jan. 10, 1990 now abandoned.

BACKGROUND OF THE INVENTION

1. Field of the Invention

The present invention relates to a non-contact IC card and, particularly, to the setting of a threshold level for detecting a received signal.

2. Description of the Related Art

FIG. 3 shows the structure of a conventional non-contact IC card. In the drawing, to a CPU 31 are connected a modulator 33 and a demodulator 34 through an UART 32, an input/output control circuit, a transmitter 35, and a receiver 36 being respectively connected to the modulator 33 and the demodulator 34. An antenna 37 is connected to the transmitter 35 and the receiver 36.

An external signal received by the antenna 37 is detected by the receiver 36, converted from an analog signal to a digital signal by the demodulator 34, and then input to the CPU 31 through the UART 32. The CPU 31 performs data processing and outputs a transmitting signal through the UART 32 as occasion demands. The transmitting signal is converted from a digital signal to an analog signal in the modulator 33 and then transmitted from the transmitter 35 through the antenna 37.

A threshold level is previously set in the receiver 36 so that the signal received through the antenna 37 is detected by comparing the level of the signal with the threshold level. For example, when an input signal $S_{10}$ including data $D_{11}$ and $D_{12}$ is input to the receiver 36, if the receiver 36 has an excessively high threshold value $V_H$, the data $D_{11}$ and $D_{12}$ cannot be detected, as shown by an output waveform $S_H$ in FIG. 4. While if the receiver 36 has an excessively low threshold value $V_L$, there is the danger of detecting not only the true data $D_{11}$ and $D_{12}$ but also noise $N_{11}$ and $N_{12}$, as shown by an output waveform $S_L$ in FIG. 4. The receiver 36 is therefore required to have a threshold level corresponding to the transmission level of external equipment which transmits a signal to the IC card.

However, even if a threshold level corresponding to the transmission level of external equipment is set, there is a danger of errors if the IC card is used in a different environment such as a very noisy place. IC cards having the same function are sometimes used in combination with various external apparatus having different transmission levels for particular uses.

In such cases, it is necessary to redesign the receiver 36 so that a threshold level corresponding to the environment and conditions of use are set therein. There is therefore a problem in that much time and labor are required.

SUMMARY OF THE INVENTION

The present invention has been achieved with a view to resolving the above-described problem, and it is an object of the present invention to provide a non-contact IC card which allows a threshold level to be easily set in correspondence with different environments and conditions of use.

A non-contact IC card in accordance with the present invention comprises a CPU for processing data, a memory circuit for storing a program used for controlling the CPU, an antenna for transmitting data to and receiving data from an external apparatus, a plurality of receivers having different threshold levels for detecting signals received by the antenna, selection means for selecting one of the plurality of receivers and connecting the selected receiver to the CPU, and a transmitter for transmitting a signal output from the CPU through the antenna.

DESCRIPTION OF THE PREFERRED EMBODIMENTS

An embodiment of the present invention is described below with reference to the attached drawings.

Figure 1:
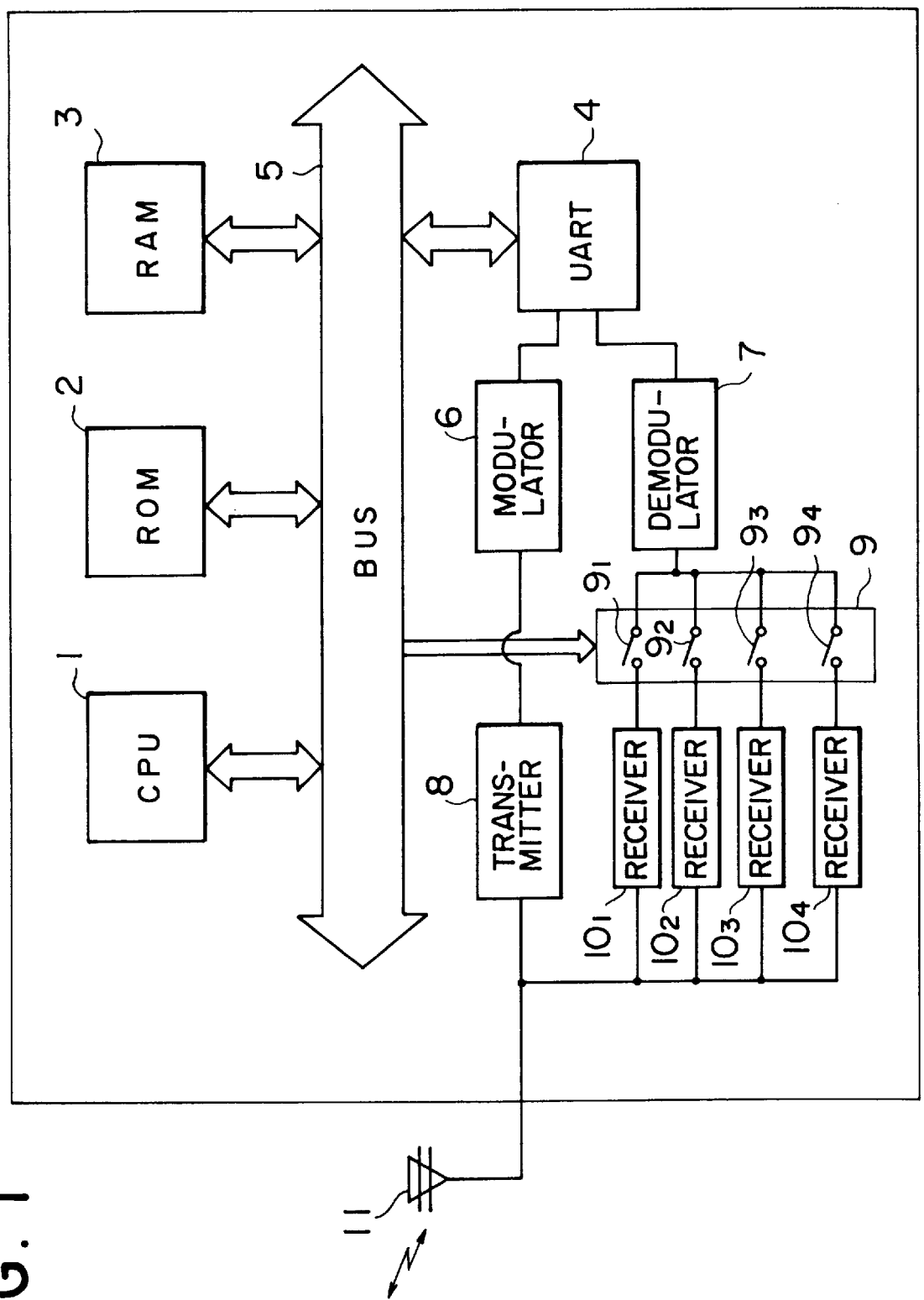
FIG. 1 is a block diagram of the structure of a non-contact IC card in accordance with an embodiment of the present invention.

In FIG. 1, a non-contact IC card has a CPU 1 for processing data to which are connected through, a bus 55, a ROM 2 as a storage circuit for storing a program used for controlling the CPU 1, a RAM 3 for storing data and temporarily storing data for data processing in the CPU 1, and an UART 4 serving as an input and output control circuit for controlling input and output. A modulator 6 and a demodulator 7 are connected to the UART 4, a transmitter 8 being connected to the modulator 6 and first to fourth receivers $10_1$ to $10_4$ being connected to the demodulator 7 through a selector circuit 9, i.e., as a selection means. The transmitter 8 and the first to fourth receivers $10_1$ to $10_4$ are commonly connected to an antenna 11.

Figure 2:
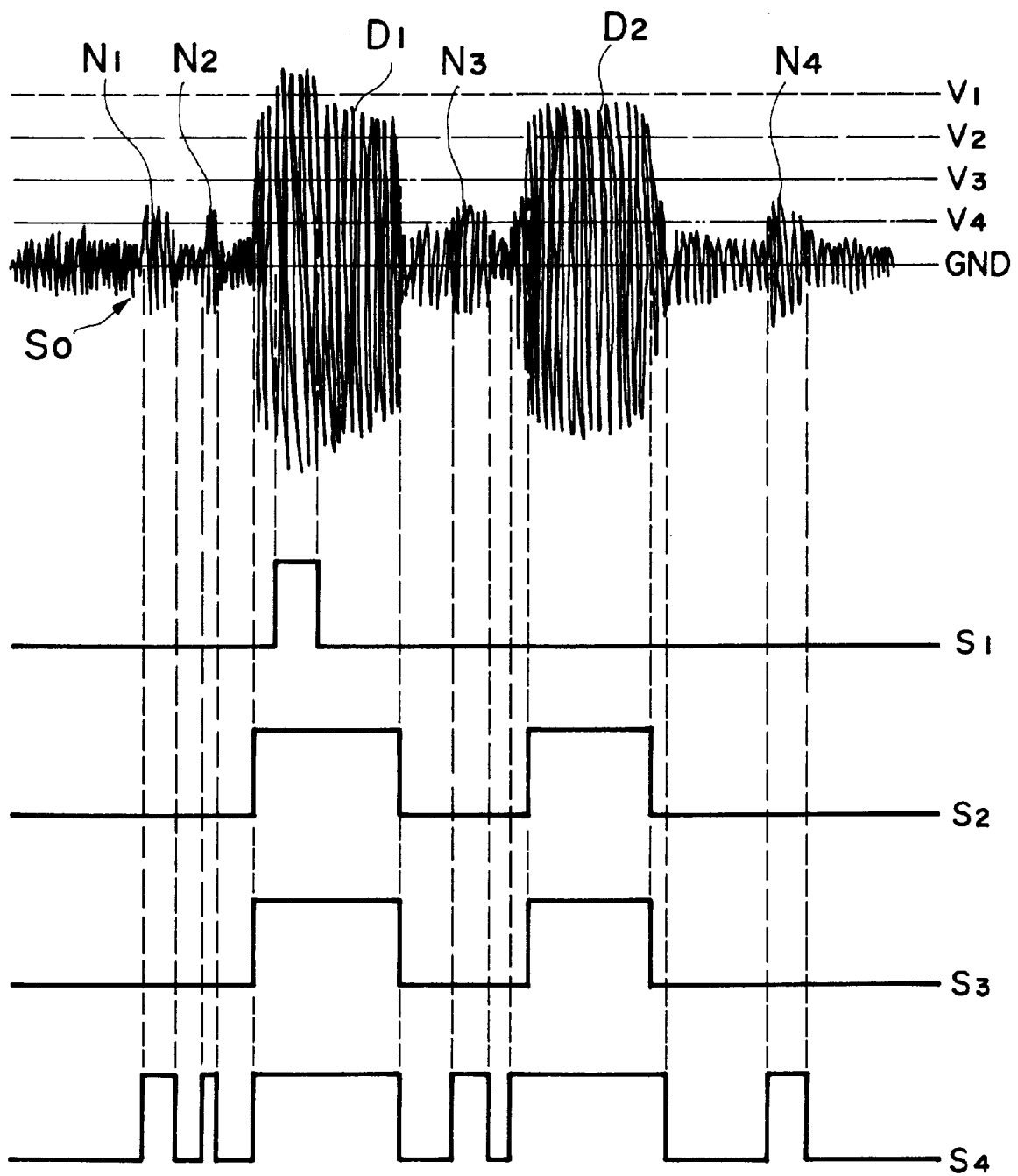
FIG. 2 is a waveform which shows the input and output characteristics of each receiver in the of FIG. 1.
Figure 3:
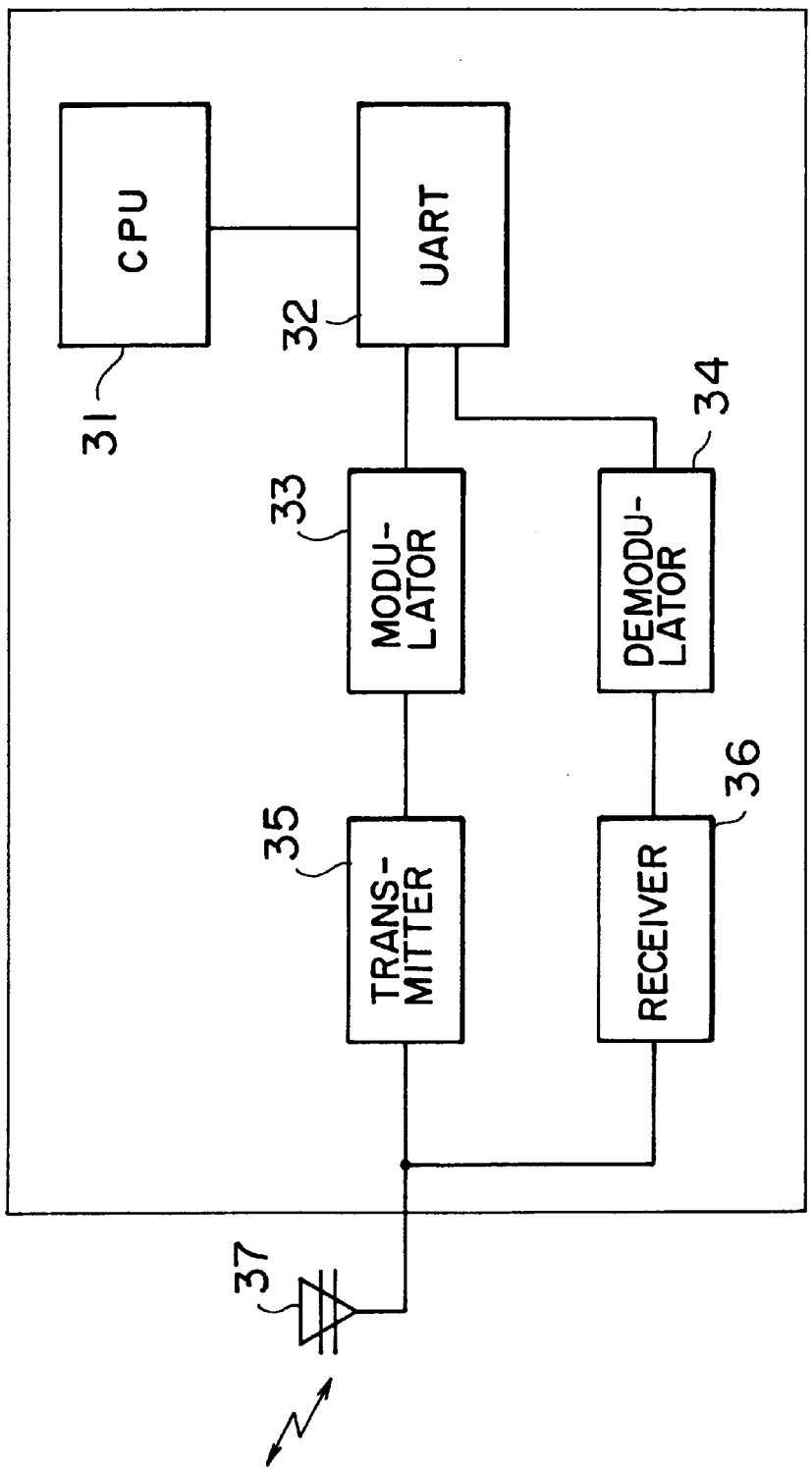
FIG. 3 is a block diagram of a conventional non-contact IC card.
Figure 4:
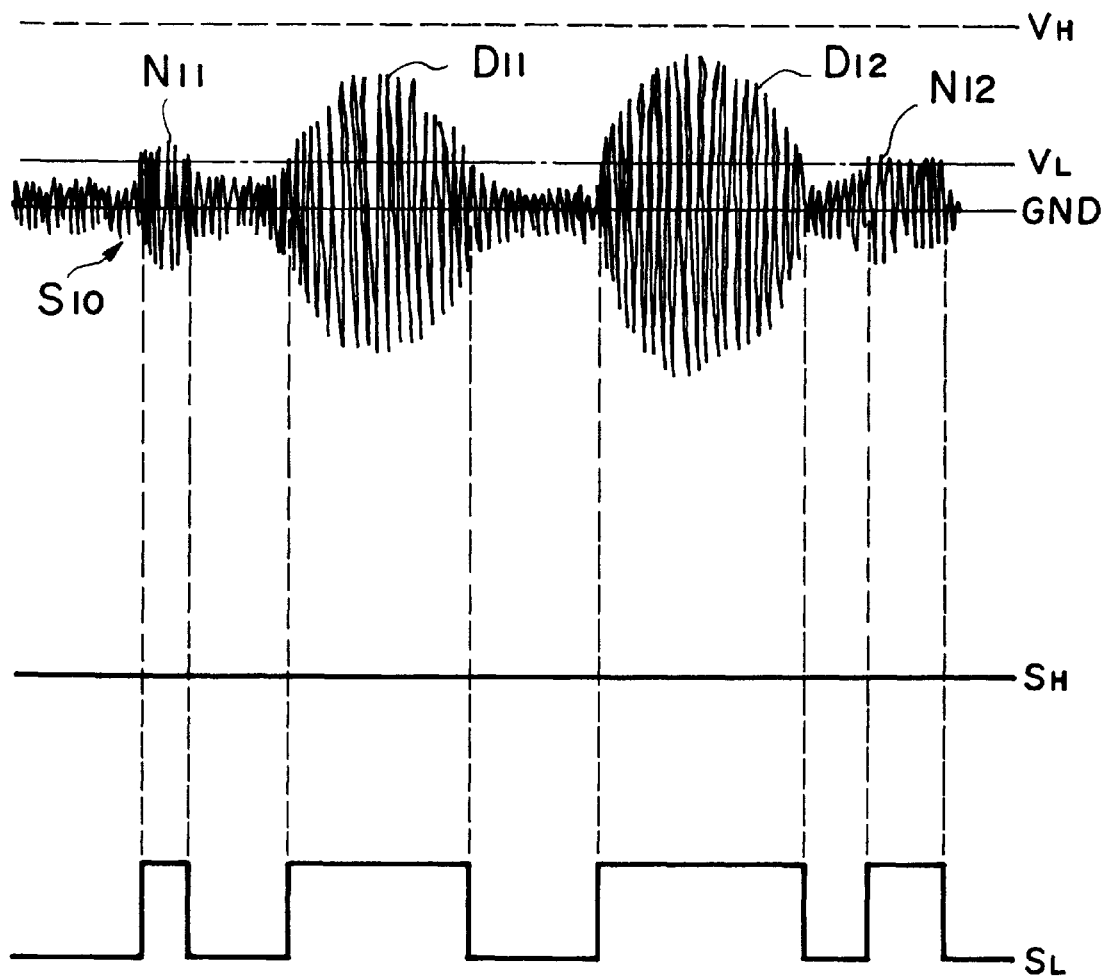
FIG. 4 is a waveform which shows the input and output characteristics of a receiver of the IC card shown in FIG. 3.

The selector circuit 9 has first to fourth switches $9_1$ to $9_4$ which are respectively connected between the first to fourth receivers $10_1$ to $10_4$ and the demodulator 7, as well as being connected to the CPU 1 through the bus 5, so that one of the four switches $9_1$, may be $9_4$ selected and closed by an indication prom the CPU 1, with the other three switches remaining open. The receivers $10_1$ to $10_4$ have different threshold levels. For example, as shown in FIG. 2, the first receiver $10_1$, the second receiver $10_2$, the third receiver $10_3$ and the fourth receiver $10_4$ have a threshold level $V_1$ of several V, a threshold level $V_2$ of several hundreds of mV, a threshold level $V_3$ of several tens of mV and a threshold level $V_4$ of several mV, respectively.

A description will now be given of the operation of the embodiment with reference to the waveform shown in FIG. 2.

An external signal received by the antenna 11 is input to each of the receivers $10_1$ to $10_4$ in which data is detected with the respective threshold levels $V_1$ to $V_4$. For example, as shown in FIG. 2, output signals $S_1$ to $S_4$ are respectively obtained from the receivers $10_1$ to $10_4$ for an input signal $S_0$ including data $D_1$ and $D_2$. The first receiver $10_1$ does not accurately detect the data $D_1$ and $D_2$ because its threshold level $V_1$ exceeds the level of the input signal $S_0$. The fourth receiver $10_4$ detects as data not only the data $D_1$ and $D_2$ but also peripheral noise $N_1$ to $N_4$ because its threshold level $V_4$ is excessively low. Both the second and third receivers $10_2$ and $10_3$ accurately detect only the data $D_1$ and $D_2$ and output the signals $S_2$ and $S_3$, respectively, because their threshold levels $V_2$ and $V_3$ are suitable for the level of the input signal $S_0$. It is therefore found that the second and third receivers $10_2$ and $10_3$ are suitable for the input signal $S_0$.

However, since the current consumed by a receiver having a high threshold level is large, if a receiver having a lower threshold level is selected from receivers from which accurate output waveforms can be obtained, the signal can be accurately received with excellent efficiency in current consumption. In other words, when the signal $S_0$ having the level shown in FIG. 2 is received, the third receiver $10_3$ is optimum.

A command to designate the selection of the third switch $9_3$ in the selector circuit 9 is inserted into the program previously stored in the ROM 2. The CPU 1 operates in accordance with the program and instructs the selector circuit 9 to select the third switch $9_3$. This instruction causes the selector circuit 9 to selectively close only the third switch $9_3$ and open the first, second, and fourth switches $9_1$, $9_2$, and $9_4$. Namely, the third receiver $10_3$ is selected from the four receivers $10_1$ to $10_4$ and connected to the CPU 1 through the demodulator 7, the UART 4 and the bus 5.

The data of the external signal received by the antenna 11 is thus detected by the third receiver $10_3$ having the threshold level $V_3$, converted from an analog signal to a digital signal by the demodulator 7 and then input to the CPU 1 through the UART 4 and the bus 5. The data is then processed by the CPU 1 and, as occasion demands, stored in the RAM 3 or output as a transmitting signal from the CPU 1 to the modulator 6 through the bus 5 and the UART 4. In the modulator 6, the data is converted from a digital signal to an analog signal and then transmitted to the outside from the transmitter 8 through the antenna 11.

Although the third receiver $10_3$ is optimum for the input signal $S_0$ exemplified in FIG. 2, when the levels of input signals are different because of different environments and conditions of use, the program previously stored in the ROM 2 may be changed so that a receiver suitable for the environments and conditions of use is selected. In this way, the IC card of the present invention enables the selection of an optimum level from the four threshold levels and the use thereof by simply changing the program previously stored in the ROM 2.

In addition, the number of receivers having different threshold levels is not limited to four, and two, three or more than four receivers may be used.

The IC card can also be designed so that an optimum receiver is automatically selected by using the program stored in the ROM 2 each time a signal is received corresponding to the level of the signal received by the antenna 11. However, the method employed in the above embodiment in which the receiver used is previously determined by using the program stored in the ROM 2 is superior to the automatic method in view of the simplification of the program and a reduction in the response time.

The present invention can be applied not only to a non-contact IC card but also to various receiving apparatus which respond to radio waves.

What is claimed is:

1. A non-contact IC card comprising:

an antenna for receiving an external analog signal containing digital data;

at least three receivers, coupled to the antenna, for receiving the analog signal and for detecting the digital data wherein each of the at least three receivers has a different signal detection threshold level for detecting the digital data;

a CPU for controlling the IC card and processing the digital data; and selection means coupled to the at least three receivers and controlled by the CPU for connecting a selected one of the at least three receivers to the CPU, the CPU controlling the selection means by connecting to the CPU, from the receivers of the at least three receivers that have accurately detected the digital data, the receiver having the lowest signal detection threshold level.

2. A non-contact IC card according to claim 1 including a single demodulator circuit coupled between the selection means and the CPU for demodulating a signal received from each of the at least three receivers.

* * * * *